United States Patent
Huang et al.

(10) Patent No.: US 11,777,618 B2
(45) Date of Patent: Oct. 3, 2023

(54) AMPLITUDE AND PHASE CALIBRATION FOR PHASED ARRAY ANTENNAS

(71) Applicant: Hughes Network Systems, LLC, Germantown, MD (US)

(72) Inventors: Xiaoling Huang, Boyds, MD (US); Channasandra Ravishankar, Clarksburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 106 days.

(21) Appl. No.: 17/562,353

(22) Filed: Dec. 27, 2021

(65) Prior Publication Data

US 2023/0081094 A1    Mar. 16, 2023

Related U.S. Application Data

(60) Provisional application No. 63/243,972, filed on Sep. 14, 2021.

(51) Int. Cl.
*H04B 17/12* (2015.01)
*H04B 7/06* (2006.01)
*H04B 17/21* (2015.01)

(52) U.S. Cl.
CPC .......... *H04B 17/12* (2015.01); *H04B 7/0639* (2013.01); *H04B 7/0656* (2013.01); *H04B 17/21* (2015.01)

(58) Field of Classification Search
CPC ........ H04B 17/21; H04B 17/11; H04B 17/19; H04B 17/12; H04B 17/26; H04B 7/0413;
(Continued)

(56) References Cited

U.S. PATENT DOCUMENTS 6,934,541 B2 * 8/2005 Miyatani ............... H01Q 3/267
455/67.11
9,705,611 B1    7/2017 West
(Continued)

FOREIGN PATENT DOCUMENTS

EP         3531506 B1      9/2021

OTHER PUBLICATIONS

International Search Report and Written Opinion for PCT/US2022/043168 dated Jan. 2, 2023, 14 pages.

*Primary Examiner* — Dung B Huynh
(74) *Attorney, Agent, or Firm* — KILPATRICK TOWNSEND & STOCKTON LLP

(57) ABSTRACT

Techniques described herein provide phase and amplitude calibration of phased array antennas. In an N-by-M phased array having N*M channels, embodiments use aggregated measurements over multiple concurrently active channels to improve signal-to-leakage performance, while also using sequences of exclusion groups to yield an individualized calibration value for each channel (i.e., N*M individualized calibration values). For example, a J×K channel group of the array is selected in each of a sequence of measurement frames based on a calibration schema. Over J*K measurement sub-frames, a set of J*K aggregate measurements is obtained, each with different subsets of the channel group activated and excluded from the measurement. The aggregate calibration measurements can be used to compute J*K individualized calibration values, each for a channel of the channel group. In some implementations, each calibration value is computed as a complex value including both amplitude and phase calibrations information.

22 Claims, 4 Drawing Sheets

(58) Field of Classification Search
CPC ... H04B 7/0617; H04B 7/0639; H04B 7/0656
See application file for complete search history.

(56) References Cited

U.S. PATENT DOCUMENTS

| | | | | |
|---|---|---|---|---|
| 10,993,242 | B1* | 4/2021 | Kim | H04B 17/12 |
| 2010/0150013 | A1* | 6/2010 | Hara | H04B 17/12 |
| | | | | 370/252 |
| 2012/0087230 | A1* | 4/2012 | Guo | H04B 7/0413 |
| | | | | 370/208 |
| 2012/0299769 | A1* | 11/2012 | Li | H01Q 3/267 |
| | | | | 342/174 |
| 2017/0142603 | A1* | 5/2017 | Yanagisako | H04W 72/0446 |
| 2018/0048492 | A1* | 2/2018 | Kundargi | H04L 25/0224 |
| 2018/0123707 | A1* | 5/2018 | Morishige | H04B 17/12 |
| 2019/0207309 | A1* | 7/2019 | Shim | H01Q 3/30 |
| 2019/0349098 | A1* | 11/2019 | Jiang | H04B 17/11 |
| 2020/0328829 | A1* | 10/2020 | Papadopoulos | H04B 17/12 |
| 2021/0257730 | A1* | 8/2021 | Ma | H04B 7/086 |
| 2022/0196798 | A1* | 6/2022 | Chen | G01S 7/40 |

\* cited by examiner

AMPLITUDE AND PHASE CALIBRATION FOR PHASED ARRAY ANTENNAS

CROSS-REFERENCE TO RELATED APPLICATIONS

This application claims priority to U.S. Provisional Patent Application No. 63/234,972, filed on Sep. 14, 2021, entitled "Methods And Systems For Amplitude And Phase Correction," the disclosure of which is hereby incorporated by reference in its entirety for all purposes.

FIELD

Embodiments relate generally to antenna systems; and, more particularly, to amplitude and phase calibration for phased array antenna systems.

BACKGROUND

Many types of modern wireless communication systems, such as satellite-based systems, use phased array antennas. A phased array antenna includes an array of antenna elements coupled with a beamformer. The beamformer can adjust the amplitudes and phases at which the antenna elements in the array communicate (e.g., transmit and/or receive), so that those communications constructively and destructively interfere in precise patterns. The patterns can be designed and controlled to form desired transmit and/or receive beams. For example, a group of antenna elements of a phased array antenna on a satellite can simultaneously transmit with carefully controlled relative amplitudes and phases, so that the result of mutual interference between the transmissions effectively manifests as a set of spot beams. Shapes, sizes, locations, and/or other characteristics of the spot beams can be adjusted by adjusting the relative phases and/or amplitudes of the transmissions.

Such beamforming relies on precise and consistent phase and amplitude control with the phased array. In practice, each antenna element of a phased array can be coupled with its own communication path, and each can have different transmission or reception characteristics (e.g., due to manufacturing tolerances). As such, achieving consistent phase and amplitude control can depend at least in part on maintaining precise calibration between the antenna elements of the phased array. Conventional calibration techniques tend to produce sub-optimal canceling of relative phase and amplitude differences across phased array antennas, particularly in context of large arrays and/or in presence of appreciable leakage in the arrays.

SUMMARY

Embodiments described herein provide phase and amplitude calibration of phased array antennas. In an N-by-M phased array having N*M channels, embodiments use aggregated measurements over multiple concurrently active channels to improve signal-to-leakage performance, while also using sequences of exclusion groups to yield an individualized calibration value for each channel (i.e., N*M individualized calibration values). For example, a J×K channel group of the array is selected in each of a sequence of measurement frames based on a calibration schema. Over J*K measurement sub-frames, a set of J*K aggregate measurements is obtained, each with different subsets of the channel group activated and excluded from the measurement. The aggregate calibration measurements can be used to compute J*K individualized calibration values, each for a channel of the channel group. In some implementations, each calibration value is computed as a complex value including both amplitude and phase calibrations information.

According to one set of embodiments, a system is provided for calibration of a phased array antenna of N×M elements (N and M are positive integers greater than 1). The system includes: a calibration data store having a calibration schema stored thereon, the calibration schema defining a sequence of measurement frames, each having a sequence of measurement sub-frames; a J×K channel group selector configured to selectively activate and deactivate any of N*M channels, each of the channels being coupled with a respective one of the N×M elements of the phased array antenna, such that for each measurement frame: the J×K channel group selector identifies a respective J×K channel group of the channels based on the calibration schema, wherein J and K are positive integers, and J and/or K is greater than 1; and the J×K channel group selector activates, for each measurement sub-frame of the measurement frame, a respective measurement subset of the J×K channel group, while excluding a respective exclusion subset of the J×K channel group; and a J*K estimator configured, for each measurement frame, to: obtain a respective set of J*K aggregated calibration measurements by obtaining, in each measurement sub-frame of the measurement frame, a respective aggregated calibration measurement of the respective measurement subset for the measurement sub-frame; and compute a respective set of J*K calibration values based on the respective set of J*K aggregated calibration measurements, such that each of the J*K calibration values is associated with a respective one of the channels of the J×K channel group.

According to another set of embodiments, a method is provided for calibration of a phased array antenna of N×M elements. The method includes: for each of one or more measurement frames defined by a calibration schema: identifying a respective J×K channel group of the channels based on the calibration schema, wherein J and K are positive integers, and J and/or K is greater than 1; obtaining a respective set of J*K aggregated calibration measurements by, for each of J*K measurement sub-frames of the measurement frame: activating a respective measurement subset of the J×K channel group, while excluding a respective exclusion subset of the J×K channel group, the measurement subset and the exclusion subset defined according to the calibration schema; and measuring the channels of the respective measurement subset to obtain a respective one of the respective set of J*K aggregated calibration measurements; and computing a respective set of J*K calibration values based on the respective set of J*K aggregated calibration measurements, such that each calibration value of the J*K calibration values is associated with a respective channel of the J×K channel group; and storing each of the calibration values as an individualized calibration value for a respective one of the N*M channels corresponding to a respective one of the N*M elements of the phased array antenna.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures.

Figure 1:
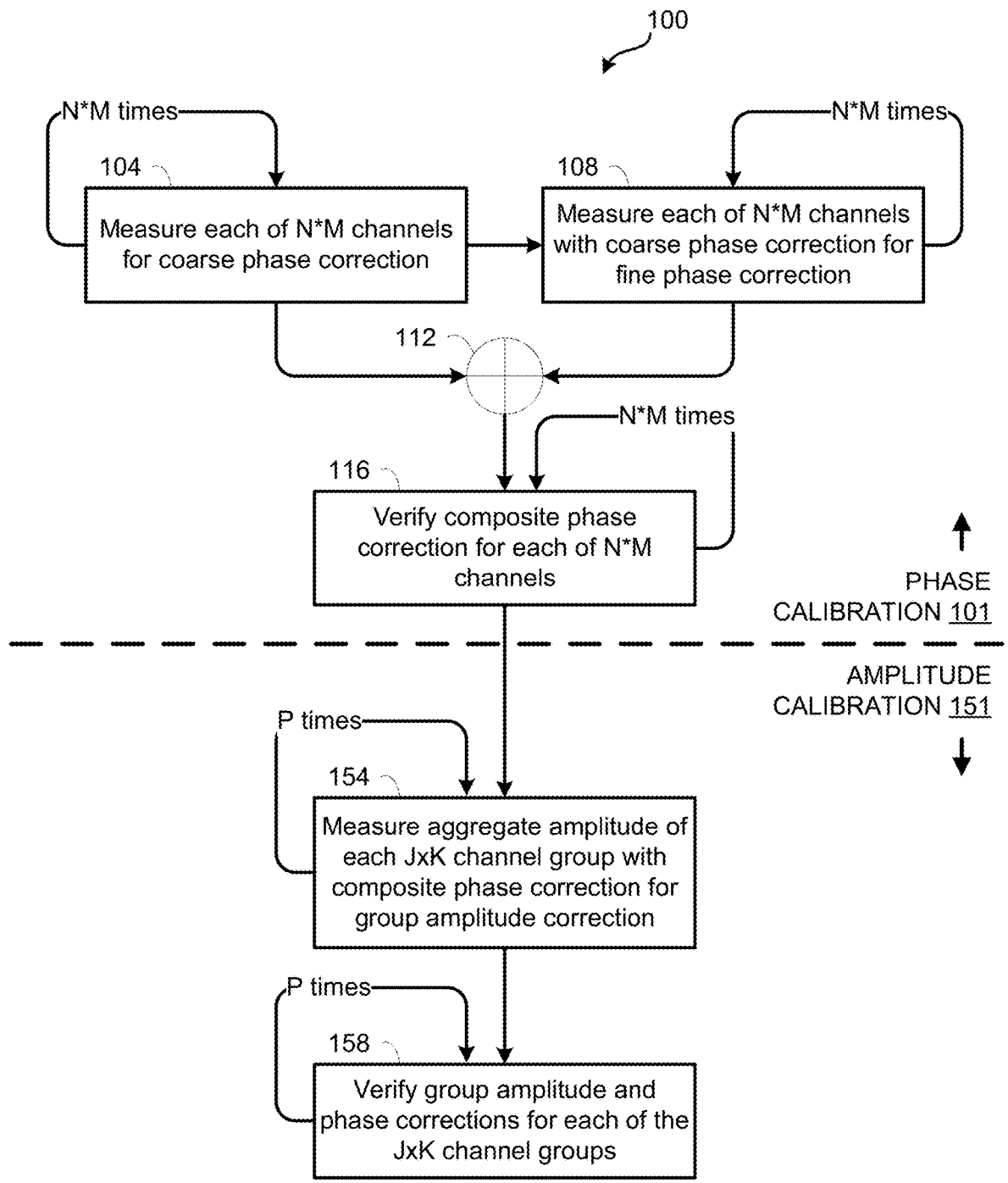
FIG. 1 shows a flow diagram of a conventional method for calibrating a phased array antenna.

In the appended figures, similar components and/or features may have the same reference label. Further, various components of the same type may be distinguished by following the reference label by a second label (e.g., a lower-case letter) that distinguishes among the similar components. If only the first reference label is used in the specification, the description is applicable to any one of the similar components having the same first reference label irrespective of the second reference label.

DETAILED DESCRIPTION

Embodiments of the disclosed technology will become clearer when reviewed in connection with the description of the figures herein below. In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

In a phased array antenna, one or more beamformers can dynamically control the individual amplitudes and phases of antenna elements in an array. Precise and consistent phase and amplitude control provides for precise and consistent control over the patterns by which simultaneous communications from those antenna elements will constructively and detractively interfere. Those constructive and destructive interference patterns can be controlled to effectively form beams, and shapes, sizes, locations, and/or other characteristics of the beams can be adjusted by adjusting the relative phases and/or amplitudes of the transmissions.

In a practical implementation of a phased array antenna, the antenna elements will not operate identically. Each antenna element can be coupled with its own communication path (e.g., based on its location in the array and/or other factors), and each antenna element can have different transmission or reception characteristics (e.g., due to manufacturing tolerances and/or other factors). Further, many larger phased array antennas tend to use multiple beamforming chips and/or other components, such that different groups of antenna elements may be associated with different hardware. Achieving reliable beamforming can rely on achieving consistent phase and amplitude control across the phased array, which can depend at least in part on maintaining precise calibration across the potentially large number of active elements antenna elements of the phased array.

Conventional calibration techniques tend to produce sub-optimal canceling of relative phase and amplitude differences across phased array antennas, particularly in context of large arrays and/or in presence of appreciable leakage in the arrays. A common conventional calibration approach is to measure the amplitude and phase of each individual antenna element in the array, and subsequently to remove relative differences in amplitude and phase across the array. Such an approach is effective in theory and can even provide sufficient calibration accuracy for some applications. However, it has been discovered that the accuracy of such individual phase and amplitude measurements can be negatively impacted by presence of leakage in the active elements, which can result in sub-optimal canceling of relative phase and amplitude differences across the array.

Some conventional approaches seek to address these inaccuracies by taking aggregate measurements of multiple elements at a time (e.g., 2, 4, 8, etc.). When turning on multiple elements together, the signals theoretically add in a coherent manner, while the noise (from the leakage) does not. As such, the aggregate measurement can theoretically increase the signal to leakage ratio (i.e., signal to noise ratio), which effectively reduces the impact of leakage on the phase and amplitude measurements. However, unless the signals being aggregated are all nearly coherent (i.e., substantially phase-aligned), the signals will not add coherently. Thus, such conventional approaches tend first to perform a phase correction so that the signals are all coherent. Subsequently, for each of multiple groups of antenna elements in the array, an aggregate amplitude measurement can be obtained for the group of elements, and the aggregate amplitude measurement can be used to perform an aggregate amplitude correction on the group of elements.

For example, FIG. 1 shows a flow diagram of a conventional method 100 for calibrating a phased array antenna. As noted above, the conventional method 100 generally includes an initial phase calibration sub-method 101 and a subsequent amplitude (gain) calibration sub-method 151. It is assumed that the method 100 is being used to calibrate a phased array antenna with an N-by-M array of antenna elements. N and M are each positive integers, at least one of N or M is greater than 1, and N and M may or may not be equal (i.e., the array may or may not be a square array), so that there is a total of N*M elements. For example, an array of 32-by-32 has a total of 1024 antenna elements. Each of the antenna elements is associated with a corresponding channel in the antenna system, so that there are N*M channels.

As used herein in context of arrays, 'x' denotes array dimensionality, while '*' denotes multiplication. According to this convention, an array of N-by-M elements can be written herein as N×M elements denoting that the two-dimensional array has N elements in one dimension and M elements in the other dimension. That same array will have a total of N*M elements denoting that the total number of elements in the array is equal to the product of the two dimensions.

The conventional method 100 begins by phase-aligning all N*M antenna elements by performing phase calibration on each of the N*M channels. At stage 104, a coarse phase correction is obtained for each single channel of the N*M channels (e.g., according to a defined sequence). During each of N*M iterations of stage 104, the phase of a single channel for that iteration can be measured by turning on the single channel with its gain set according to a default gain backoff setting, and with its phase set according to a default phase setting. For example, the default gain backoff can be 3 dB for a transmit channel, or 2 dB for a receive channel; and the default phase setting can be 0 degrees. The coarse phase correction for that channel corresponds to the measured phase during the iteration of stage 104.

At stage 108, a fine phase correction can be obtained for each channel based on the coarse phase correction obtained in stage 104. During each of N*M iterations of stage 108, the phase of a single channel for that iteration can be measured again by turning on the single channel a single channel for that iteration is turned on with its gain set according to the same default gain backoff as in stage 104, and with its phase set according to the coarse phase correction obtained for that channel in stage 104 (i.e., as opposed to using a default setting). The fine phase correction for that channel corresponds to the measured phase during the iteration of stage 108.

The coarse and fine phase corrections can be combined at stage 112 to produce a composite phase correction for each of the N*M channels. At stage 116, each channel's composite phase correction can be verified by obtaining another phase measurement from each channel while setting the channel's phase setting according to the associated composite phase measurement (and using the default gain backoff settings). For example, stage 116 can be iterated N*M times to obtain an independent verification for each channel. At the end of the phase calibration sub-method 101, the N*M channels are phase-calibrated, such that each channel is associated with a respective composite phase correction that can be applied to cause signals produced by the channels to be substantially phase-aligned (i.e., very nearly coherent).

For the amplitude calibration sub-method 151, as described above, the N×M array of channels (corresponding to the N×M array of antenna elements) is segmented into P unique J×K channel groups (sub-arrays). J, K, and P are each positive integers; at least one of J or K is greater than 1; J and K may or may not be equal; and P=(N*M)/(J*K). For example, if N=M=16 (i.e., a 16-by-16 square array of 256 elements), and J=K=2 (i.e., each sub-array is a 2-by-2 square array, which is a respective 4 of the 256 elements), there will be 64 channel groups (i.e., P=64). At stage 154, a group amplitude correction is obtained for each of the P J×K channel groups. During each of P iterations of stage 154, all J*K channels of the pth channel group are turned on with the gains set to the default gain backoff setting, and each channel's phase set according to its composite phase correction obtained in the phase calibration sub-method 101. Notably, the result of each iteration of stage 154 is a single aggregate amplitude measurement that yields a single group amplitude correction for all J×K channels in that channel group.

At stage 158, each channel group's group amplitude correction can be verified by obtaining another amplitude measurement for each channel group while applying the respective group corrections. For example, during each of P iterations of stage 158, all J*K channels of the pth channel group are turned on with the gains all set to the same group amplitude correction, and each channel's phase set according to its composite phase correction. At the end of the amplitude calibration sub-method 151, while each of the N*M channels are individually phase-calibrated, the channels are only amplitude-calibrated at a channel group level.

As noted above, an aggregated approach to amplitude calibration, such as in FIG. 1 can improve signal-to-leakage ratio and can tend to improve calibration relative to individually turning on and measuring each channel. However, such an approach is still limited in a number of ways. For example, applying the same amplitude correction to all elements in a channel group effectively limits the resolution of the calibration. Such a reduced calibration resolution can tend to result in sub-optimal cancellation of relative amplitude differences across multiple elements, especially where those differences are large. Another limitation of such a conventional approach is that reliance on an initial phase calibration sub-method can add overhead (e.g., time, complexity, memory resources, etc.) to the overall calibration.

Embodiments described herein include novel techniques to calibration of phase and amplitude for phased array antennas by obtaining individual amplitude corrections, while still using an aggregate measurement approach to improve signal-to-leakage ratio. For example, the phased array is segmented into sub-arrays, such that each sub-array is a channel group of J*K channels. Rather than obtaining a single group-level measurement for all channels in the channel group, J*K measurements are taken for each channel group, and each measurement is taken with a different portion of the channel group excluded. Some embodiments can achieve appreciably increased signal-to-leakage ratios in channel measurements by performing aggregate measurements on large sub-arrays, while still maintaining individual channel-level calibration resolution. Some embodiments described herein provide additional features, such as using a same set of measurements to concurrently perform both phase and amplitude calibration.

Figure 2:
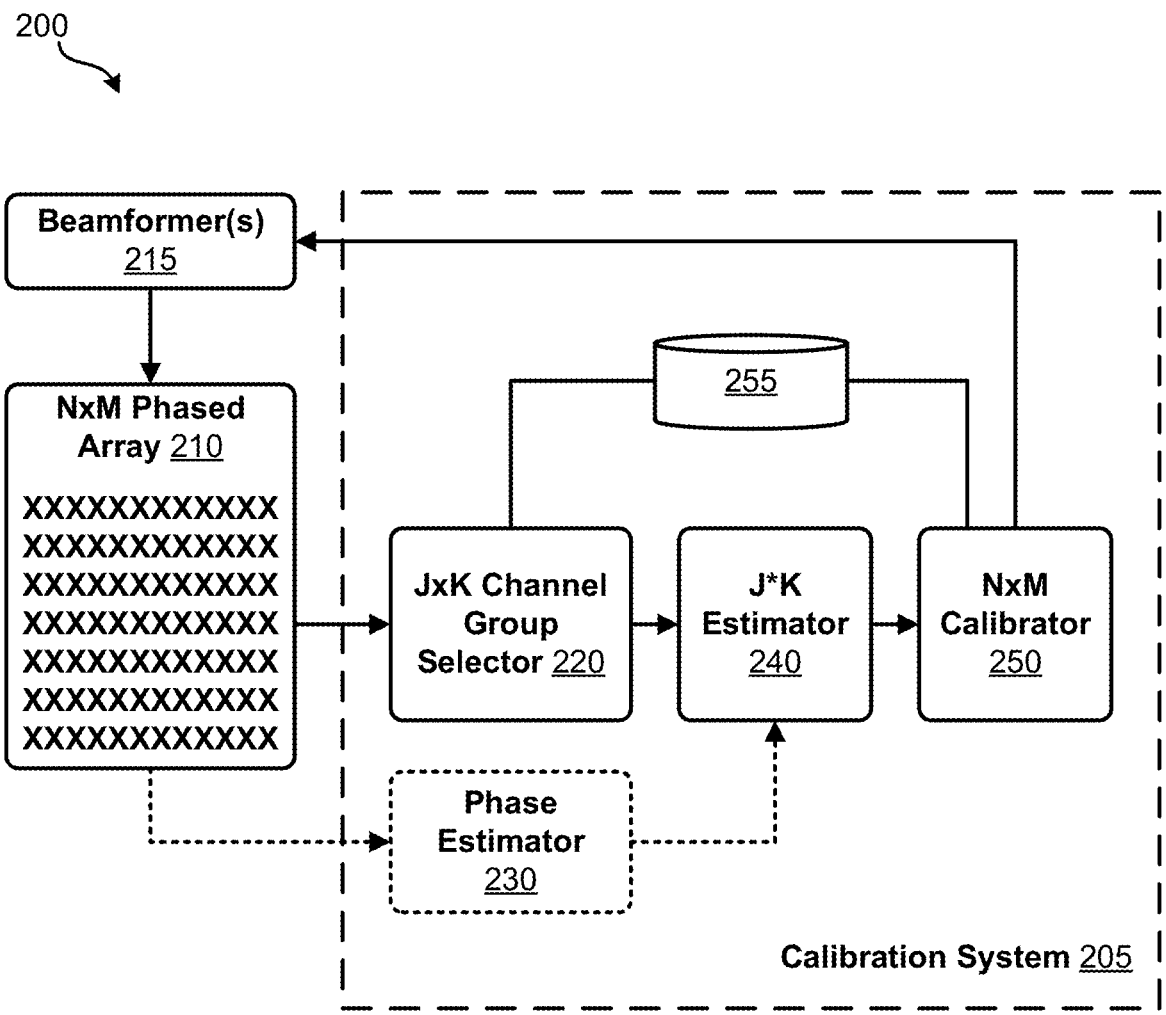
FIG. 2 shows a block diagram of an illustrative calibration environment including a phased array antenna and a calibration system, according to various embodiments described herein.

FIG. 2 shows a block diagram of an illustrative calibration environment 200 including a phased array antenna 210 and a calibration system 205, according to various embodiments described herein. The phased array antenna 210 includes N×M active array elements associated with N×M channels. The amplitude (gain) and phase of each channel can be independently controlled by one or more beamformers 215. Differences between the channels and/or active elements of the array can manifest as each channel having its own relative amplitude and/or phase offsets relative to other channels. As noted above, the calibration system 205 is configured to measure and cancel those relative amplitude and/or phase offsets so that the beamformers 215 can control the individual channel amplitudes and phases in a consistent and reliable (e.g., highly deterministic) manner.

As illustrated, the calibration system 205 can include a J×K channel group selector 220, a J*K estimator 240, an N×M calibrator 250, and a calibration data store 255. Some embodiments include a separate phase estimator 230. In such embodiments, the phase estimator 230 performs a phase calibration separate from and prior to the amplitude calibration. For example, embodiments of the phase estimator 230 can operate according to the phase calibration sub-method 101 of FIG. 1. As described herein, other embodiments can effectively combine phase and amplitude calibration into a single set of measurements, such that those embodiments do not include a separate phase estimator 230.

Embodiments of the J×K channel group selector 220 are coupled with the phased array antenna 210 to activate and deactivate selected channels based on a predetermined calibration schema. The calibration schema or schemas can be stored in the calibration data store 255. Various calibrations schemas are described below. In general, each calibration schema defines a sequence of measurement frames and sub-frames. For each measurement frame, a J×K sub-array of the phased array antenna 210 is identified based on the calibration schema to correspond to a selected J×K channel group. In some embodiments, each selected J×K channel group is disjoint from all other J×K channel groups, so that the total number of J×K channel groups in an N×M array is N*M/J*K, denoted as 'P' herein. For example, in a 32-by-30 array (960 elements), the calibration schema can define 240 measurement frames each to correspond to a respective one of 240 disjoint (i.e., unique) 2-by-2 channel groups. In other embodiments, the calibration schema can be designed so that channels of J×K channel groups can overlap, yielding a P that exceeds N*M/J*K. For example, for the same 32-by-30 array of the preceding example, another calibration schema can define a different 240 measurement frames, wherein each corresponds to a respective one of 240 partially overlapping 8-by-8 channel groups (i.e., each channel group shares some of its channels with one or more other channel groups). There may be instances where the calibration schema is designed to calibrate fewer than all of the elements of the phased array antenna 210, such that P*(J*K) is less than N*M.

Each of the P measurement frames includes J*K measurement sub-frames to correspond to each of the J*K elements of the J×K channel group. For each measurement sub-frame, the calibration schema defines a respective exclusion subset (Q) of the J×K channel group. In some implementations, Q is 1, such that the exclusion subset identifies a respective one of the J*K channels of the channel group for each measurement sub-frame. In other implementations, Q is greater than or equal to 1 and less than or equal to (J*K)/2. In other implementations, Q is greater than 1 and less than (J*K)−1. Thus, for each measurement sub-frame, the calibration schema defines an exclusion subset (i.e., Q channels of the J×K channel group) and a measurement subset (i.e., the remaining J*K−Q channels of the J×K channel group). In some embodiments, the calibration schema is designed, in each measurement sub-frame, to turn on the measurement subset according to in-phase settings (i.e., based on a common default phase offset, based on respective phase pre-calibrations, etc.), while leaving the Q channels of the exclusion subset turned off. In other embodiments, the calibration schema is designed, in each measurement sub-frame, to turn on the measurement subset according to in-phase settings, while turning on the Q channels of the exclusion subset according to out-of-phase settings (e.g., a 180-degree offset is applied to each of the Q channels of the exclusion subset).

In each measurement sub-frame of each measurement frame, the J*K estimator 240 can obtain an aggregated measurement of the respective measurement subset (for the measurement sub-frame) of the respective J×K channel group (for the measurement frame), such that the J*K estimator 240 obtains a set of J*K aggregate measurements in each measurement frame. For the set of J*K channels of any J×K channel group, there is a corresponding set of J*K unknown calibration values (e.g., amplitude and/or complex amplitude-phase values). The set of J*K aggregate measurements obtained by the J*K estimator 240 in a measurement frame for a J×K channel group can be used to compute the corresponding set of J*K unknown calibration values for that J×K channel group.

For example, the set of J*K unknown calibration values (i.e., the values to be calibrated) can be considered as a vector z, the set of J*K aggregate measurements obtained by the J*K estimator 240 in a measurement frame can be considered as a vector y, and noise in the channels of the J×K channel group (e.g., measured leakage from other channels, and/or other noise sources, etc.) can be considered as a vector n. For each measurement frame, the calibration schema can be considered as defining (e.g., explicitly, or effectively) a (J*K)×(J*K) illumination matrix, W, where each row of W identifies the measurement subset and the exclusion subset of the J×K channel group for a corresponding measurement sub-frame. In some embodiments, the illumination matrix is a template that can be applied to each J×K channel group to define the sequence of measurement subsets and exclusion subsets for the measurement sub-frames in each measurement frame.

As one example, W for a 4-channel (e.g., 2-by-2) channel group can be defined as follows:

$$W = \begin{bmatrix} 0 & 1 & 1 & 1 \\ 1 & 0 & 1 & 1 \\ 1 & 1 & 0 & 1 \\ 1 & 1 & 1 & 0 \end{bmatrix}$$

Each row of W corresponds to a measurement sub-frame. According to such a definition, '1' indicates that a particular element is turned on and is therefore part of the measurement subset, and '0' indicates that a particular element is turned off and is therefore part of the exclusion subset.

As another example, W for a 4-channel (e.g., 2-by-2) channel group can be defined as follows:

$$W = \begin{bmatrix} -1 & 1 & 1 & 1 \\ 1 & -1 & 1 & 1 \\ 1 & 1 & -1 & 1 \\ 1 & 1 & 1 & -1 \end{bmatrix}$$

As in the preceding example, each row of W corresponds to a measurement sub-frame. Unlike in the preceding example, the matrix is defined here so that '1' indicates that a particular element is turned on and is therefore part of the measurement subset, and '−1' indicates that a particular element is turned on with an out-of-phase setting (e.g., with a 180-degree phase offset) and is therefore part of the exclusion subset. In both of these examples, the calibration schema indicates to exclude a single one of the channels in each measurement sub-frame (i.e., Q=1), such that each row identifies a different respective one of the channels to exclude.

For a particular measurement frame, the measurements obtained by the J*K estimator 240 can be used to compute estimates for the set of J*K unknown calibration values (i.e., for vector z) based on a system of equations defined by: y=Wz+n. In some embodiments, the J*K estimator 240 uses least squares estimation to compute the estimate of vector z as $\hat{z}=(W^T W)^{-1} W^T y$. Thus, even though each measurement obtained by the J*K estimator 240 is an aggregate measurement of multiple of the channels of a channel group, the output of the J*K estimator 240 at the end of each measurement frame indicates an individualized calibration value for each channel of the channel group (i.e., J*K individual calibration values, as opposed to one calibration value for all J*K channels).

Embodiments of the N×M calibrator 250 are coupled with the J*K estimator 240 to receive the calibration values for each channel of each channel group and to contextualize those calibration values with respect to the entire N×M array. Some embodiments of the N×M calibrator 250 manage storing and/or updating of the calibration values in the calibration data store 255. Some embodiments of the N×M calibrator 250 can retrieve the stored values from the calibration data store 255, and can pass the retrieved values to the beamformers 215 so that the beamformers 215 can operate with appropriately calibrated amplitude and phase offsets.

Components of the calibration system 205 can be implemented using any suitable components. For example, the calibration system 205, or components thereof, can be implemented by a central processing unit (CPU), an application-specific integrated circuit (ASIC), an application-specific instruction-set processor (ASIP), a digital signal processor (DSP), a field-programmable gate array (FPGA), a programmable logic device (PLD), a controller, a microcontroller unit, a reduced instruction set (RISC) processor, a complex instruction set (CISC) processor, a microprocessor, or the like, or any combination thereof. The calibration data store 255 can be implemented by any suitable on-board, or off-board storage. For example, the calibration data store 255 can include local storage (e.g., one or more solid-state drives, hard disk drives, registers, etc.), remote storage (e.g., a remote server), and/or distributed storage (e.g., cloud-based storage). In some embodiments, operation of components of the calibration system 205 is implemented by storing processor readable instructions in the calibration data store 255. In such embodiments, those instructions, when executed, cause one or more processors (e.g., processor-based components) of the calibration system 205 to perform features described herein.

Figure 3:
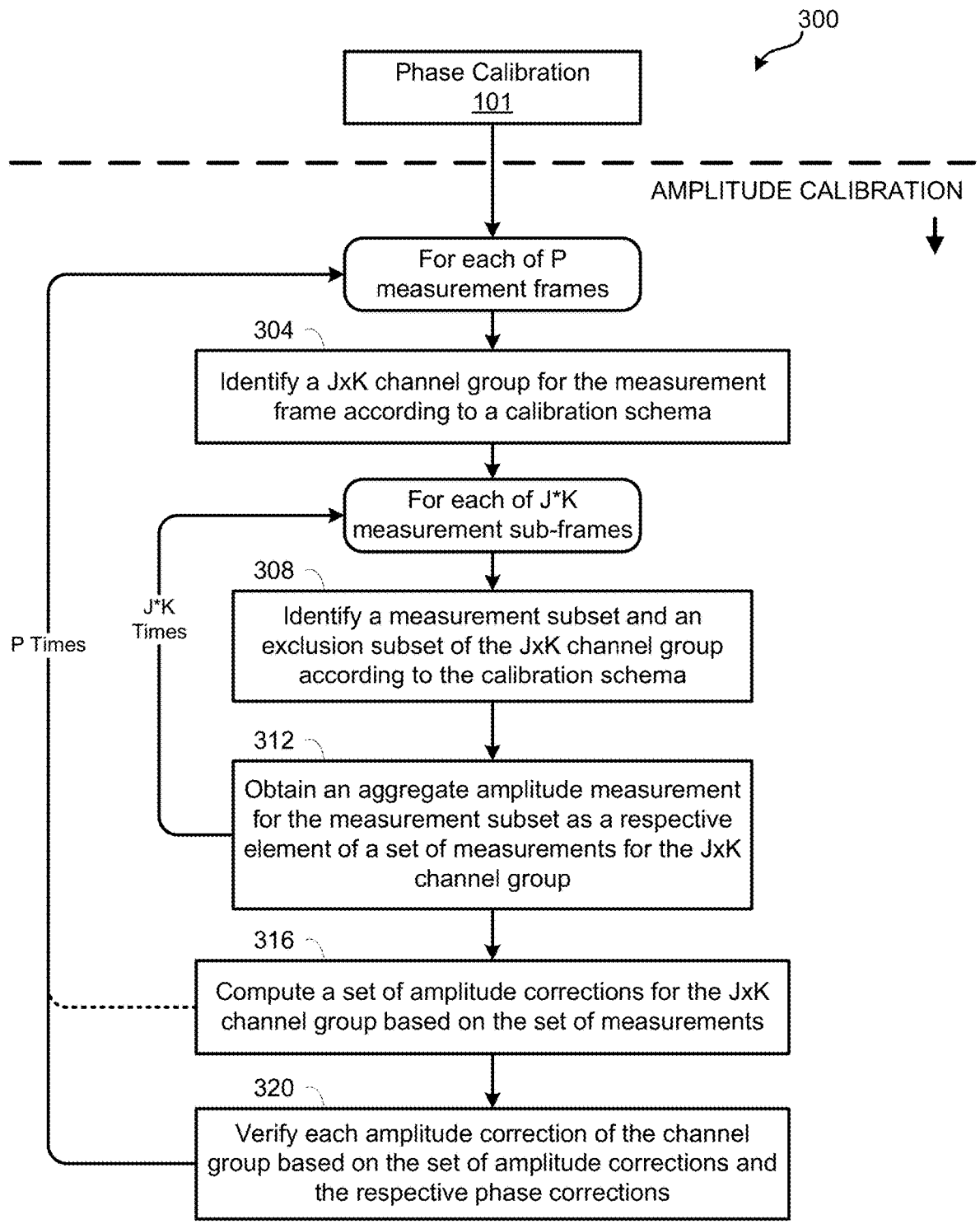
FIG. 3 shows a flow diagram of a method for implementing an illustrative calibration schema that has separate phase and amplitude calibration sub-methods, according to various embodiments.

As described above, embodiments of the calibration system 205 can be used to implement various types of calibration schemas. FIG. 3 shows a flow diagram of a method 300 for implementing an illustrative calibration schema that has separate phase and amplitude calibration sub-methods, according to various embodiments. As illustrated, an initial phase calibration sub-method 101 can be implemented in substantially the same manner as described above with reference to FIG. 1. For example, a first set of N*M iterations is used to obtain a coarse phase correction for each channel based on default initial phase settings, a second set of N*M iterations is then used to obtain a fine phase correction for each channel based on the respective coarse phase corrections, and the coarse and fine phase corrections can be combined in to composite phase corrections for each channel. Thus, embodiments of the method 300 can continue with amplitude calibration using the phase corrections obtained in the phase calibration sub-method 101.

As described above with reference to FIG. 2, that amplitude calibration can be implemented as a sequence of measurement sub-frame iterations embedded in a sequence of measurement frame iterations. As illustrated, stages 304-320 (or 304-316 in some implementations) can be performed for each of P measurement frame iterations; and within each of the P measurement frame iterations, stages 308 and 312 can be performed for each of J*K measurement sub-frame iterations. Each of the P measurement frame iterations begins at stage 304 by identifying a J×K channel group of the N×M phased array antenna for use in the measurement frame. The identification at stage 304 can be based on a sequence defined by a calibration schema.

Having identified the J×K channel group for the entire measurement frame, the method 300 can iterate through the J*K measurement sub-frame iterations. Each measurement sub-frame iteration begins at stage 308 by identifying a measurement subset and an exclusion subset of the J×K channel group. The identifying in stage 308 can be based on a sequence, template, or any other suitable definition indicated by the calibration schema. In stage 312, the measurement sub-frame iteration continues by obtaining an aggregate amplitude measurement for the measurement subset with the exclusion subset excluded. In each measurement sub-frame iteration, the channels of the measurement subset can be turned on with their respective gains set to a default gain backoff setting (e.g., as described above) and their respective phases set to their previously calibrated phase corrections. In some implementations, excluding the exclusion subset can involve turning (or leaving) off those excluded channels. In other implementations, excluding the exclusion subset can involve setting those excluded channels to be 180-degrees out of phase with the measurement subset, or the like. Each aggregate amplitude measurement obtained in each measurement sub-frame iteration can be recorded as a respective one of a set of measurements for the J×K channel group.

After completing the J*K measurement sub-frame iterations, the measurement frame iteration can continue at stage 316 by computing a set of amplitude corrections based on the set of measurements for the J×K channel group. For example, as described above, the set of measurements can effectively be considered as (e.g., stored as) a vector of J*K elements, each being the measurement result from a corresponding one of the measurement sub-frame iterations. The measurement vector, a noise vector, and an illumination matrix describing the measurement sub-frame definitions of the calibration schema can be used to compute a vector of amplitude corrections defining an individualized amplitude correction for each of the J*K channels of the channel group. At stage 320, embodiments can verify each amplitude correction by obtaining additional channel measurements using the computed amplitude corrections and pre-calibrated phase corrections for each channel. In some embodiments, amplitude and/or phase corrections are verified only for some channels of the phased array. In other embodiments, amplitude and phase corrections are verified for all channels of the phased array. In some embodiments, stages 304-316 are iterated for all P measurement frames, after which some or all channels are verified in stage 320. In other embodiments, stages 304-320 are iterated for each of the P measurement frames, such that the verification in stage 320 is performed on each channel group.

Figure 4:
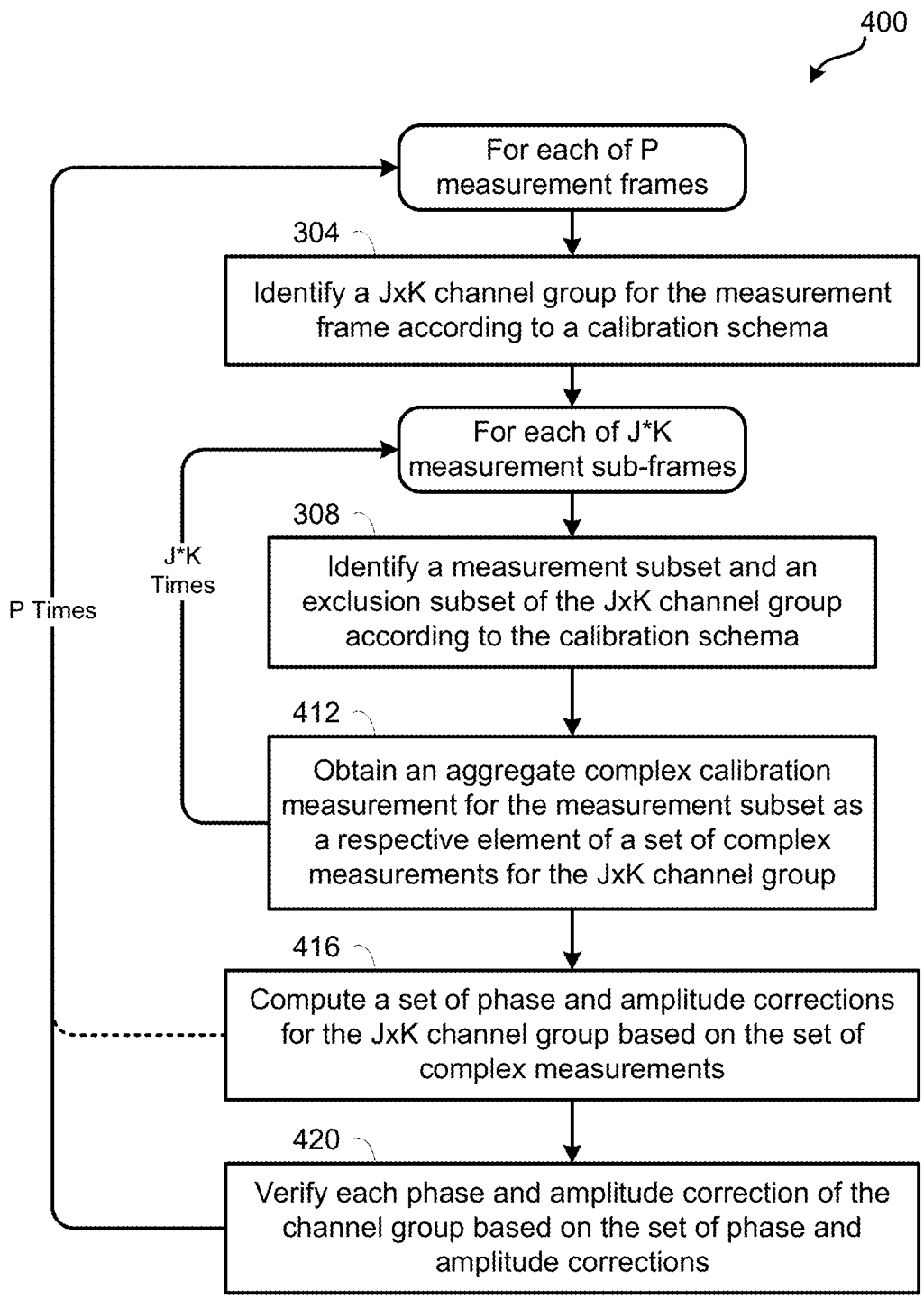
FIG. 4 shows a flow diagram of a method for implementing an illustrative calibration schema that has combined phase and amplitude calibration, according to various embodiments.

FIG. 4 shows a flow diagram of a method 400 for implementing an illustrative calibration schema that has combined phase and amplitude calibration, according to various embodiments. It can be seen that, unlike in FIG. 3, the method 400 does not include an initial phase calibration sub-method. Rather, both the phase and amplitude calibrations are performed within the measurement frame iterations. Accordingly, the method 400 begins at the stage 304 (of one of P measurement frame iterations) by identifying a J×K channel group of the N×M phased array antenna for use in the measurement frame iteration. As noted above, the identification at stage 304 can be based on a sequence defined by a calibration schema.

Having identified the J×K channel group for the entire measurement frame, the method 300 can iterate through the J*K measurement sub-frame iterations. As in method 300 of FIG. 3, each measurement sub-frame iteration begins at stage 308 by identifying a measurement subset and an exclusion subset of the J×K channel group according to the calibration schema. The method 400 can continue the measurement sub-frame iteration at stage 412 by obtaining an aggregate complex calibration measurement for the measurement subset with the exclusion subset excluded. In each measurement sub-frame iteration, the channels of the measurement subset can be turned on with their respective gains and phases set to default settings. In some implementations, excluding the exclusion subset can involve turning (or leaving) off those excluded channels. In other implementations, excluding the exclusion subset can involve setting those excluded channels to be 180-degrees out of phase with the measurement subset, or the like.

Each measurement obtained in each measurement sub-frame iteration is, in fact, a complex value that includes both amplitude and phase information. In the method 300 of FIG. 3, only the amplitude portion of the aggregate measurement (corresponding to the aggregate amplitude) is used, and individual phase measurements are obtained previously and separately. In this method 400, the real and imaginary portions of each complex aggregate measurement can be used to concurrently obtain both aggregate amplitude and an aggregate phase information. Thus, each aggregate complex calibration measurement obtained in each measurement sub-frame iteration can be recorded as a respective one of a set of complex (i.e., amplitude and phase) measurements for the J×K channel group.

After completing the J*K measurement sub-frame iterations, the measurement frame iteration can continue at stage 416 by computing a set of amplitude and phase corrections based on the set of amplitude and phase measurements for the J×K channel group. For example, the set of measurements can effectively be considered as (e.g., stored as) a vector of J*K elements, each being the complex measurement result from a corresponding one of the measurement sub-frame iterations. The measurement vector and an illumination matrix describing the measurement sub-frame definitions of the calibration schema can be used to compute a vector of complex amplitude-phase corrections defining an individualized amplitude correction and an individualized phase correction for each of the J*K channels of the channel group. At stage 420, embodiments can verify each amplitude correction and each phase correction by obtaining additional channel measurements using the computed amplitude and phase corrections for each channel. In some embodiments, amplitude and/or phase corrections are verified only for some channels of the phased array. In other embodiments, amplitude and phase corrections are verified for all channels of the phased array. In some embodiments, stages 304, 308, 412, and 416 are iterated for all P measurement frames, after which some or all channels are verified in stage 420. In other embodiments, stages 304, 308, 412, 416, and 420 are iterated for each of the P measurement frames, such that the verification in stage 420 is performed on each channel group.

The novel calibration approaches described herein, such as those described with reference to FIGS. 2-4, provide various features. One feature is that the novel calibration approaches use aggregate measurements to reduce the impact of noise on measurement quality (e.g., by increasing signal-to-leakage ratio), while still ultimately obtaining individualized phase and/or amplitude corrections for each channel. Another feature of some of the approaches described herein is that phase and amplitude corrections can be obtained concurrently without relying on pre-calibration of channel phases.

Another feature is that the approaches described herein can calibrate using relatively large channel groups. As described above, in conventional approaches, increasing the size of channel groups can improve noise performance, but also reduces calibration resolution and corresponding accuracy. As such, even conventional approaches that aggregate measurements across channel groups tend to be restricted to using only relatively small channel groups (e.g., groups of 4 channels, etc.). Because the novel approaches described herein obtain individualized amplitude and phase corrections for each channel, the calibration resolution is effectively the same regardless of channel group size.

For example, suppose either method 300 or method 400 is used to calibrate a 32-by-30 element phased array antenna. Some implementations can logically segment the 960 array elements into 240 disjoint 2-by-2 channel groups with single-channel exclusion subsets (i.e., Q=1). In such implementations, the aggregate measurements can improve noise performance (e.g., the SNR may increase by approximately 4.7 dB because three channels are measured at a time), while still ultimately computing 960 individualized amplitude and phase corrections. Other implementations can logically segment the 960 array elements into a single 32-by-30 channel group with single-channel exclusion subsets (i.e., Q=1). Again, in such implementations, the aggregate measurements can improve noise performance (e.g., the SNR may increase by almost 30 dB), while still ultimately computing 960 individualized amplitude and phase corrections. Other implementations can logically segment the 960 array elements into 15 64-channel channel groups with 8-channel exclusion subsets (i.e., Q=8). Again, in such implementations, the aggregate measurements can improve noise performance (e.g., the SNR may increase by almost 17.5 dB), while still ultimately computing 960 individualized amplitude and phase corrections. Other implementations can use any suitable size of channel groups and any suitable size of exclusion subset. In some cases, using larger channel groups can provide additional features. One such feature is that, in a large array, using larger channel groups (or a single channel group for the entire array) can reduce impacts of environmental variability that can occur over a longer measurement time. For example, with a large P (i.e., a large number of channel groups), a relatively large amount of time may elapse between the beginning of the first measurement frame and the beginning of the last measurement frame, and temperature variation over that amount of time can impact measurement accuracy.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A system for calibration of a phased array antenna of N×M elements, N and M being positive integers greater than 1, the system comprising:
   a calibration data store having a calibration schema stored thereon, the calibration schema defining a sequence of measurement frames, each having a sequence of measurement sub-frames;
   a J×K channel group selector configured to selectively activate and deactivate any of N*M channels, each of the channels being coupled with a respective one of the N×M elements of the phased array antenna, such that for each measurement frame:
      the J×K channel group selector identifies a respective J×K channel group of the channels based on the calibration schema, wherein J and K are positive integers, and J and/or K is greater than 1; and
      the J×K channel group selector activates, for each measurement sub-frame of the measurement frame, a respective measurement subset of the J×K channel group, while excluding a respective exclusion subset of the J×K channel group; and
   a J*K estimator configured, for each measurement frame, to:
      obtain a respective set of J*K aggregated calibration measurements by obtaining, in each measurement sub-frame of the measurement frame, a respective aggregated calibration measurement of the respective measurement subset for the measurement sub-frame; and
      compute a respective set of J*K calibration values based on the respective set of J*K aggregated calibration measurements, such that each of the J*K calibration values is associated with a respective one of the channels of the J×K channel group.

2. The system of claim 1, further comprising:
   a phase estimator configured to perform a phase calibration by individually measuring a phase offset of each channel of the N*M channels to obtain a respective phase calibration value for the channel,
   wherein each aggregated calibration measurement is an aggregated amplitude measurement obtained while each channel of the measurement subset is set to the respective phase calibration value for the channel.

3. The system of claim 1, wherein each aggregated calibration measurement is an aggregated complex calibration measurement including amplitude and phase information obtained while each channel of the measurement subset is set to a default phase setting.

4. The system of claim 1, further comprising:
   an N×M calibrator coupled with the J*K estimator to store the respective set of J*K calibration values to the calibration data store such that each of the J*K calibration values from each of the measurement frames is stored as an individualized calibration value for a respective one of the N*M channels corresponding to a respective one of N*M elements of the phased array antenna.

5. The system of claim 1, wherein, the calibration data store has, stored thereon, a plurality of calibration schemas including the calibration schema.

6. The system of claim 1, wherein the number of measurement frames is equal to N*M/J*K, and each J×K channel group is disjoint from each other J×K channel group.

7. The system of claim 1, wherein the number of measurement frames is greater than N*M/J*K.

8. The system of claim 1, wherein the calibration schema defines the sequence of measurement frames to have a single measurement frame with a single J×K channel group that includes all N*M channels.

9. The system of claim 1, wherein, in each measurement sub-frame, the respective exclusion subset corresponds to a single channel of the respective J×K channel group for the measurement frame.

10. The system of claim 1, wherein, in each measurement sub-frame, the respective exclusion subset corresponds to Q channels of the respective J×K channel group for the measurement frame, where Q is an integer between 2 and (J*K)/2.

11. The system of claim 1, wherein, for each measurement sub-frame of each measurement frame, the J×K channel group selector activates the respective measurement subset of the J×K channel group, while excluding the respective exclusion subset of the J×K channel group by turning on all of the respective measurement subset of channels, while leaving off all of the respective exclusion subset of channels.

12. The system of claim 1, wherein, for each measurement sub-frame of each measurement frame, the J×K channel group selector activates the respective measurement subset of the J×K channel group, while excluding the respective exclusion subset of the J×K channel group by turning on all J*K channels of the J×K channel group with the respective exclusion subset of channels set to be nominally 180-degrees out-of-phase relative to the respective measurement subset of channels.

13. The system of claim 1, wherein, for each measurement frame:
   the J*K estimator is configured to compute the respective set of J*K calibration values as a least squares estimate of a vector, z, as $(W^T W)^{-1} W^T y$,
   W being a $(J*K) \times (J*K)$ illumination matrix, each row corresponding to the respective measurement subset and the respective exclusion subset for a respective one of the measurement sub-frames of the measurement frame; and
   y being a vector representing the respective set of J*K aggregated calibration measurements obtained in the measurement frame.

14. The system of claim 13, wherein, for each measurement frame, the J*K estimator is configured to compute the respective set of J*K calibration values further based on a system of equations defined by $y = Wx + n$, n being a vector representing a set of noise measurements for the channels of the respective J×K channel group for the measurement frame.

15. A method for calibration of a phased array antenna of N×M elements, N and M being positive integers greater than 1, the method comprising:

for each of one or more measurement frames defined by a calibration schema:
identifying a respective J×K channel group of the channels based on the calibration schema, wherein J and K are positive integers, and J and/or K is greater than 1;
obtaining a respective set of J*K aggregated calibration measurements by, for each of J*K measurement sub-frames of the measurement frame:
activating a respective measurement subset of the J×K channel group, while excluding a respective exclusion subset of the J×K channel group, the measurement subset and the exclusion subset defined according to the calibration schema; and
measuring the channels of the respective measurement subset to obtain a respective one of the respective set of J*K aggregated calibration measurements; and
computing a respective set of J*K calibration values based on the respective set of J*K aggregated calibration measurements, such that each calibration value of the J*K calibration values is associated with a respective channel of the J×K channel group; and
storing each of the calibration values as an individualized calibration value for a respective one of the N*M channels corresponding to a respective one of the N*M elements of the phased array antenna.

16. The method of claim 15, further comprising:
performing a phase calibration on the N*M channels prior to all of the measurement frames by individually measuring a phase offset of each channel of the N*M channels to obtain a respective phase calibration value for the channel,
wherein each aggregated calibration measurement is an aggregated amplitude measurement obtained while each channel of the measurement subset is set to the respective phase calibration value for the channel.

17. The method of claim 15, wherein each aggregated calibration measurement is an aggregated complex calibration measurement including amplitude and phase information obtained while each channel of the measurement subset is set to a default phase setting.

18. The method of claim 15, further comprising, subsequent to the computing the respective set of J*K calibration values in each of the plurality of measurement frames:
verifying each calibration value of the respective set of J*K calibration values by activating and measuring the respective channel associated with the calibration value and measuring the respective channel with a gain offset and a phase offset configured based on the calibration value.

19. The method of claim 15, wherein the number of measurement frames is equal to N*M/J*K, and each J×K channel group is disjoint from each other J×K channel group.

20. The method of claim 15, wherein, in each measurement sub-frame, the respective exclusion subset corresponds to a single channel of the respective J×K channel group for the measurement frame.

21. The method of claim 15, wherein, for each measurement sub-frame of each measurement frame, activating the respective measurement subset of the J×K channel group, while excluding the respective exclusion subset of the J×K channel group comprises turning on all of the respective measurement subset of channels, while leaving off all of the respective exclusion subset of channels.

22. The method of claim 15, wherein, for each measurement sub-frame of each measurement frame, activating the respective measurement subset of the J×K channel group, while excluding the respective exclusion subset of the J×K channel group comprises turning on all J*K channels of the J×K channel group with the respective exclusion subset of channels set to be nominally 180-degrees out-of-phase relative to the respective measurement subset of channels.

* * * * *